(12) United States Patent
Kraus

(10) Patent No.: US 11,871,703 B2
(45) Date of Patent: Jan. 16, 2024

(54) BALER IMPLEMENT WITH IDENTIFICATION TAG READER

(71) Applicant: DEERE & COMPANY, Moline, IL (US)

(72) Inventor: Timothy J. Kraus, Blakesburg, IA (US)

(73) Assignee: DEERE & COMPANY, Moline, IL (US)

( * ) Notice: Subject to any disclaimer, the term of this patent is extended or adjusted under 35 U.S.C. 154(b) by 702 days.

(21) Appl. No.: 17/077,107

(22) Filed: Oct. 22, 2020

(65) Prior Publication Data

US 2022/0124985 A1 Apr. 28, 2022

(51) Int. Cl.
| | |
|---|---|
| *A01F 15/14* | (2006.01) |
| *A01F 15/04* | (2006.01) |
| *B30B 9/30* | (2006.01) |
| *G06K 19/077* | (2006.01) |
| *G06K 7/10* | (2006.01) |

(52) U.S. Cl.
CPC ............ *A01F 15/145* (2013.01); *A01F 15/04* (2013.01); *B30B 9/3007* (2013.01); *G06K 7/10366* (2013.01); *G06K 19/07758* (2013.01)

(58) Field of Classification Search
CPC ........ A01F 15/145; A01F 15/14; A01F 15/04; A01F 15/141; A01F 15/148; B30B 9/3007; G06K 7/10366; G06K 19/07758
See application file for complete search history.

(56) References Cited

U.S. PATENT DOCUMENTS

| | | | | |
|---|---|---|---|---|
| 2,204,149 | A * | 6/1940 | Pratt | ............... G09F 3/04 40/305 |
| 3,110,182 | A * | 11/1963 | Moss | ............... G01N 1/04 73/864.33 |
| 6,397,437 | B1 * | 6/2002 | Shofner | ............... G01N 21/8915 19/66 CC |
| 10,303,997 | B2 | 5/2019 | Hamilton et al. | |

(Continued)

FOREIGN PATENT DOCUMENTS

| | | | |
|---|---|---|---|
| CN | 110381727 A * | 10/2019 | ........... A01F 15/042 |
| EP | 1053673 B1 | 8/2004 | |

(Continued)

OTHER PUBLICATIONS

Extended European Search Report and Written Opinion issued in European Patent Application No. 21203313.8, dated Mar. 14, 2022, in 05 pages.

*Primary Examiner* — Ismael Izaguirre

(57) ABSTRACT

A baler implement includes a housing that defines a baling chamber for forming crop material into a bale. The baler implement further includes a knotter system having a component that is moveable between a standby position and a wrapping position while wrapping the bale. A knotter sensor communicates a knotter engagement signal in response to movement of the component. A reader is in communication with the knotter sensor and is emits an interrogation signal for reading an identification tag on the bale. The reader emits the interrogation signal for a predefined period of time in response to the knotter engagement signal from the knotter sensor indicating movement of the component of the knotter system while wrapping the bale with the strand material.

10 Claims, 6 Drawing Sheets

(56) References Cited

U.S. PATENT DOCUMENTS

| | | |
|---|---|---|
| 10,588,263 B2 | 3/2020 | Kraus |
| 10,657,433 B2 | 5/2020 | Hamilton et al. |
| 2002/0108216 A1* | 8/2002 | Foster .................... D01G 13/00 |
| | | 19/145.5 |
| 2017/0287303 A1 | 10/2017 | Lang et al. |
| 2018/0295781 A1 | 10/2018 | Hamilton et al. |
| 2020/0128754 A1* | 4/2020 | Hamilton ............... G06K 19/04 |

FOREIGN PATENT DOCUMENTS

| | | |
|---|---|---|
| EP | 3228180 B1 | 9/2019 |
| WO | WO2018164980 A1 | 9/2018 |

* cited by examiner

BALER IMPLEMENT WITH IDENTIFICATION TAG READER

TECHNICAL FIELD

The disclosure generally relates to a baler implement having a bale identification system for identifying and tracking data related to a bale of crop material, and a method of identifying and tracking data related to a bale of crop material.

BACKGROUND

Agricultural baler implements gather, compress, and shape crop material into a bale. There are different types of baler implements that create bales. One type of baler implement is often referred to as a square baler or a large square baler, which produces bales having a rectangular or square shape. These square bales may be referred to as parallelepiped shaped bales. Another type of baler implement is often referred to as a round baler implement, which produces a bale having a round or cylindrical shape.

The bales are formed from crop material and have or exhibit characteristics or properties of the bale and/or the crop material. For example, each bale may exhibit a respective weight, moisture content, material content, ash content, location, etc. Bale producers may desire to identify and track one or more of the characteristics or properties of each respective bale, so that this information may be accurately communicated to an end user or purchaser of that respective bale.

SUMMARY

A baler implement is provided. The baler implement includes a housing that defines a baling chamber for forming crop material into a bale. The baler implement further includes a knotter system. The knotter system is engageable to wrap the bale with a wrapping strand. The knotter system includes a component that is moveable between a standby position and a wrapping position during engagement of the knotter system to wrap the bale. A knotter sensor is positioned to detect movement of the component between the standby position and the wrapping position. The knotter sensor is operable to communicate a knotter engagement signal in response to movement of the component. A tag installer is operable to attach an identification tag to the bale. A reader is in communication with the knotter sensor and is positioned to interrogate the identification tag. The reader is operable to emit an interrogation signal and receive an identification signal from the identification tag in response to the interrogation signal. The reader is automatically activated to emit the interrogation signal for a defined period of time in response to the knotter engagement signal from the knotter sensor indicating movement of the component of the knotter system while wrapping the bale with the strand material.

In one aspect of the disclosure, the reader is a radio frequency identification reader, and the identification tag is a radio frequency identification tag. In one implementation, the identification tag is a read only radio frequency identification tag.

In one aspect of the disclosure, the baler implement includes a bale sensor for sensing a property or characteristic of the bale. The baler implement includes a baler implement controller in communication with the bale sensor and having a processor and a memory having a bale identification algorithm stored thereon. The processor is operable to execute the bale identification algorithm to receive data related to the bale from the bale sensor and receive the knotter engagement signal from the knotter sensor. The baler implement controller may control the reader to emit the interrogation signal in response to receiving the knotter engagement signal. The reader may receive the identification signal from the identification tag in response to the interrogation signal. The identification signal includes identification data related to the identification tag. The baler implement controller may then associate the data related to the bale with the identification data related to the identification tag of the bale, and communicate the associated data related to the bale and the identification data related to the identification tag to a remote memory.

In one aspect of the disclosure, the wrapping strand is one of a twine material or a plastic strap material.

In one aspect of the disclosure, the component of the knotter system may include, but is not limited to, one of a needle yoke arm, a needle yoke, a bill hook, a knotter clutch, a tension arm, or a twine disc.

In one aspect of the disclosure, the knotter sensor may include, but is not limited to, one of an on/off switch, a light beam sensor, a rotary sensor, a camera, a proximity sensor, or a motion sensor.

A method of identifying and tracking a bale is also provided. The method includes collecting crop material with a pick-up of a baler implement, and conveying the crop material from the pick-up into a baling chamber of the baler implement. The crop material is formed into a bale having a shape within the baling chamber. The bale is wrapped with a strand material using a knotter system of the baler implement to secure the shape of the bale. The knotter system includes a component that moves between a standby position and a wrapping position while wrapping the bale with the strand material. An identification tag is installed onto the bale with a tag installer. The identification tag is a radio frequency identification tag including data related to the identification tag. Data is received from a bale sensor with a baler implement controller. The data from the bale sensor is related to a characteristic of the bale. A knotter engagement signal from a knotter sensor indicating movement of the component is received by the baler implement controller. An interrogation signal is emitted from a reader for a predefined period of time in response to receiving the knotter engagement signal. The identification data related to the identification tag is received with the reader in response to the interrogation signal. The baler implement controller may then associated the data related to the characteristic of the bale with the identification data from the identification tag of the bale, and communicate the associated data related to the bale and the identification data from the identification tag to a remote memory.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

Figure 1:
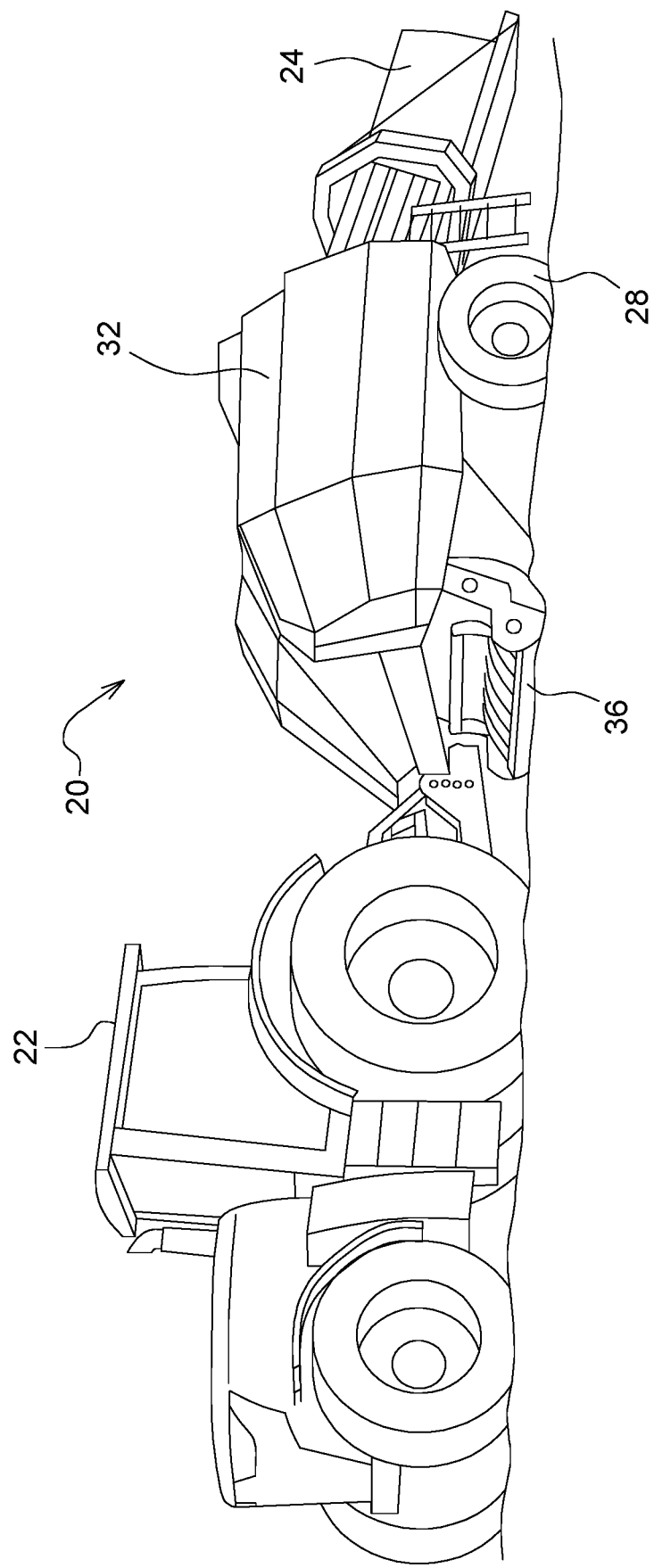
FIG. 1 is a schematic perspective view of a baler implement drawn by a tractor.
Figure 2:
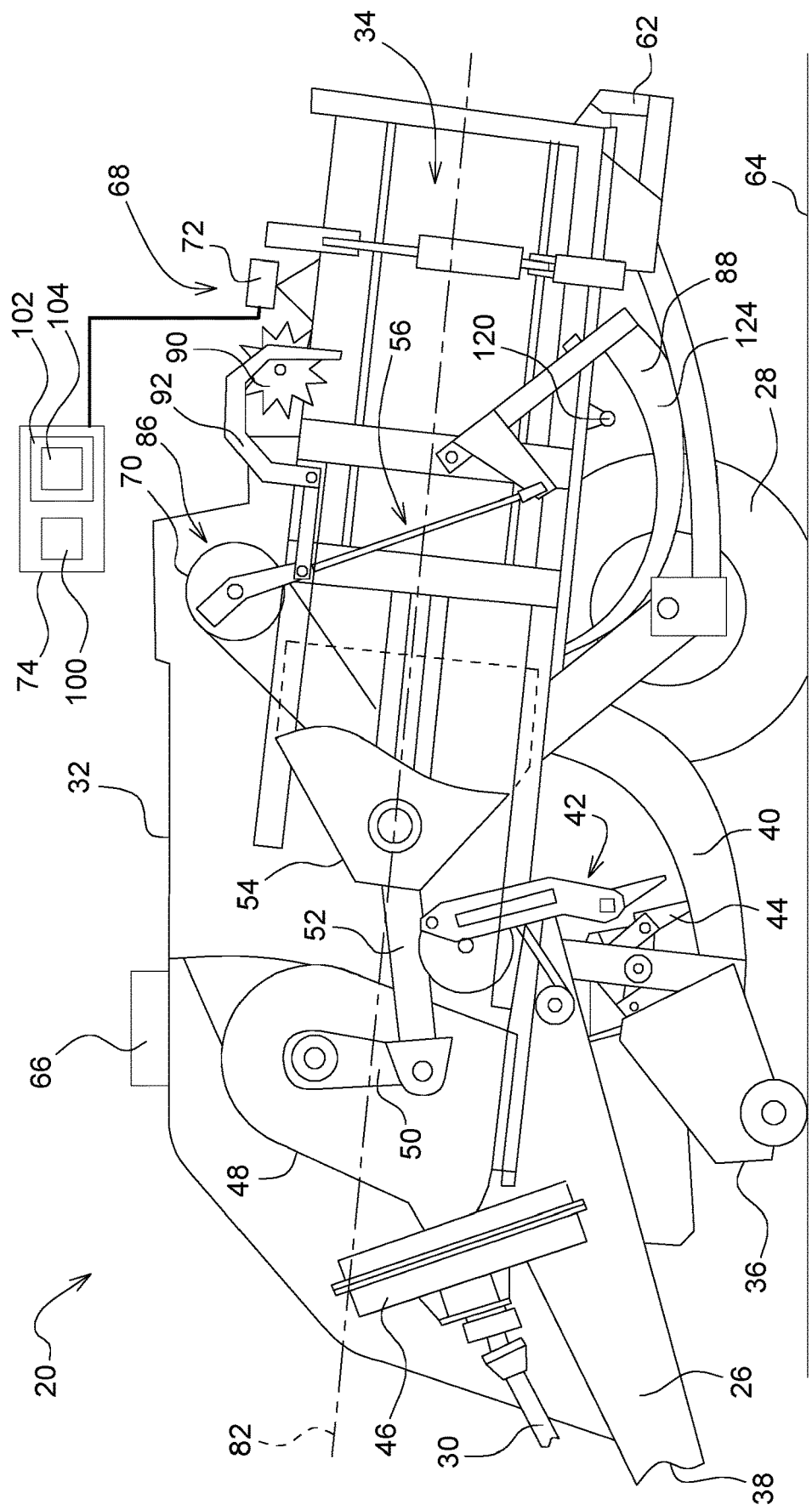
FIG. 2 is a schematic side view of the baler implement.

Referring to the Figures, wherein like numerals indicate like parts throughout the several views, a baler implement is generally shown at 20 in FIGS. 1 and 2. Referring to FIGS. 1 and 2 the baler implement 20 is shown as a large square baler. However, it should be appreciated that the teachings of this disclosure may be applied to other baler platforms, such as a round baler, and are not limited to the example implementation of the large square baler shown in the Figures and described herein.

As shown in FIG. 1, a traction unit 22 or vehicle, such as but not limited to a tractor, is coupled to the baler implement 20 for pulling and powering the baler implement 20. However, it should be appreciated that in other embodiments, the baler implement 20 may be self-propelled, in which case the traction unit 22 and the baler implement 20 are configured as a single, self-propelled vehicle.

As depicted in FIG. 1, the baler implement 20 may move across a field and gather and process crop material to form a bale 24. The baler implement 20 may then eject the formed bale 24 from the rear of the baler implement 20. In the example implementation described herein, the bale 24 includes a parallelepiped shape. However, other implementations may form the bale 24 to include a different shape, such as but not limited to a cylindrical shape.

Referring to FIG. 2, the exemplary embodiment of the baler implement 20 includes a frame 26, ground engaging devices 28, such as but not limited to wheels, and an input shaft 30, such as a power-take-off (PTO) shaft, which can receive rotational power from a power source, such as the traction unit 22.

The baler implement 20 includes a housing 32 or body, which generally shields various internal components of the baler implement 20. The housing 32 is attached to and supported by the frame 26. The housing 32 includes multiple wall sections or panels that form and/or define a baling chamber 34 for forming the bale 24. The baling chamber 34 may alternatively be referred to as a compression chamber.

The baler implement 20 includes a pick-up mechanism 36. The pick-up mechanism 36 is disposed proximate a forward end 38 of the frame 26. The pick-up mechanism 36 gathers crop material from a ground surface 64 and directs the gathered crop material toward and into an inlet of the baling chamber 34. The pickup mechanism may include, but is not limited to tines, forks, augers, conveyors, baffles, etc., for gathering and moving the crop material. The baler implement 20 may be equipped with a pre-cutter, disposed between the pickup mechanism and the inlet. As such, the pre-cutter is disposed downstream of the pickup and upstream of the inlet relative to a direction of travel of the crop material. The pre-cutter cuts or chops the crop material into smaller pieces.

In the example implementation shown in the Figures and described herein, the pick-up mechanism 36 directs the gathered crop material into a pre-compression passageway 40, which stores a volume of gathered crop material. A feeder system 42 includes a plurality of forks 44, which are timed to move the crop material from the pre-compression passageway 40, through the inlet, and into the baling chamber 34.

The input shaft 30 or PTO shaft is connected to an input of a transmission 46 to provide rotational power to the baler implement 20 from the traction unit 22 or other associated vehicle or power source. The transmission 46 includes a gearbox 48 which converts the rotational motion of the input shaft 30 along a generally longitudinal axis 82 of the baler implement 20 to an output of the transmission 46 having a rotational motion along a generally transverse axis of the baler implement 20.

The baler implement 20 includes a crank arm 50 connected to the output of the transmission 46. A connecting link 52 interconnects the crank arm 50 and a plunger 54. The crank arm 50 rotates based upon the output of the transmission 46 and the plunger 54 moves in a reciprocal motion within the compression chamber as the crank arm 50 rotates. The plunger 54 extends into the compression chamber, thereby compressing the crop material, and then at least partially retracts from the compression chamber, at which time the feeder system 42 moves more crop material into the baling chamber 34, i.e., compression chamber.

When the bale 24 is formed within the baling chamber 34, a knotter system 56 wraps a plurality of wrapping strands 58 around the bale 24 to secure the shape of the bale 24. When the baler implement 20 is configured as the large square baler, such as described herein, the knotter system 56 wraps the wrapping strands 58 around a longitudinal extent or longest length of the bale 24, with each individual wrapping strand 58 encircling the bale 24. The knotter system 56 ties each end of the individual wrapping strands 58 together to form a knot 60, securing each respective wrapping strand 58 in place. The wrapping strand 58 may include, but is not limited to, a twine, a twine material, a twine strand, a strap, a plastic strap, a filament, etc.

Figure 3:
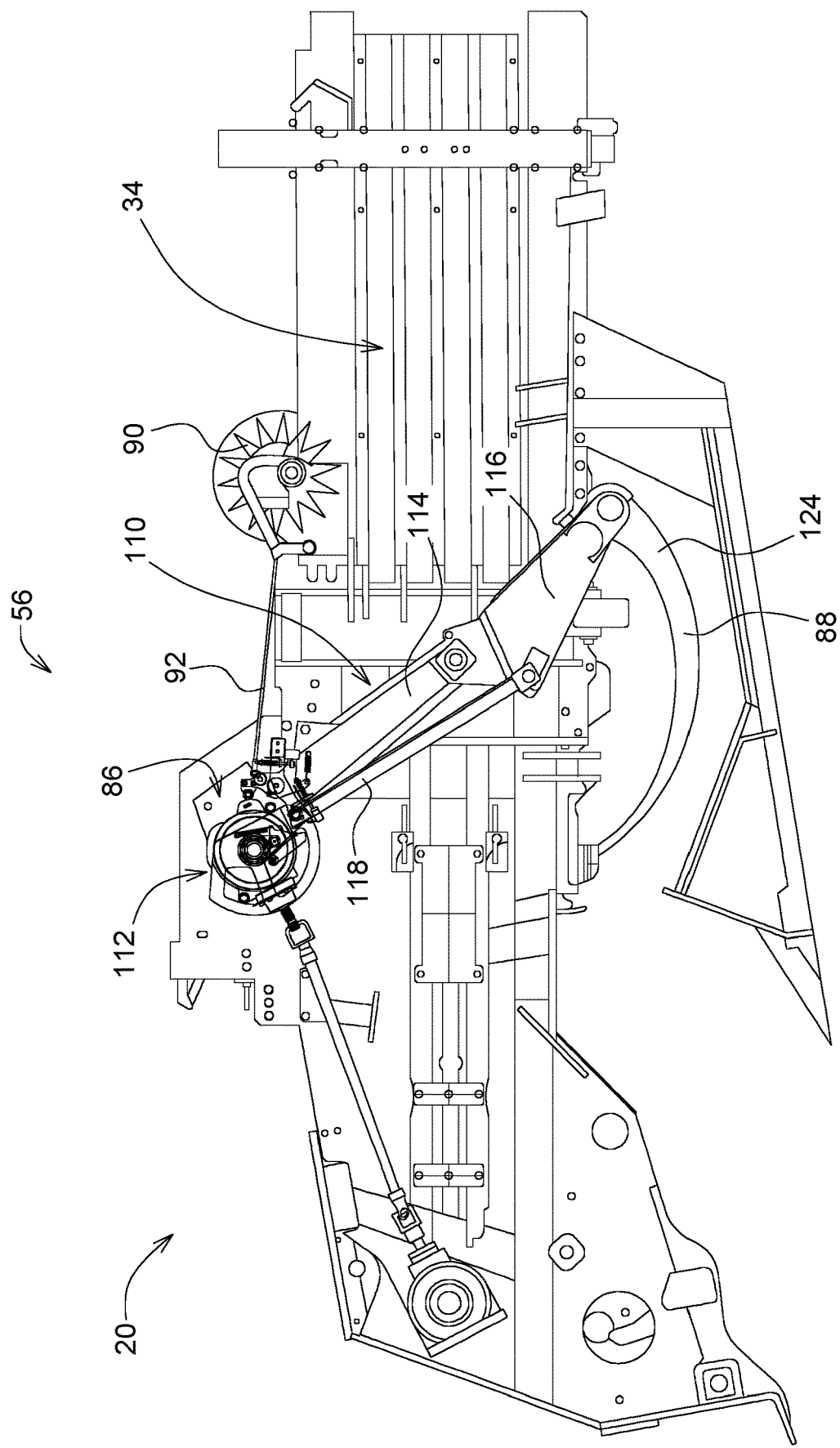
FIG. 3 is an enlarged schematic side view showing a knotter system of the baler implement in a standby position.
Figure 4:
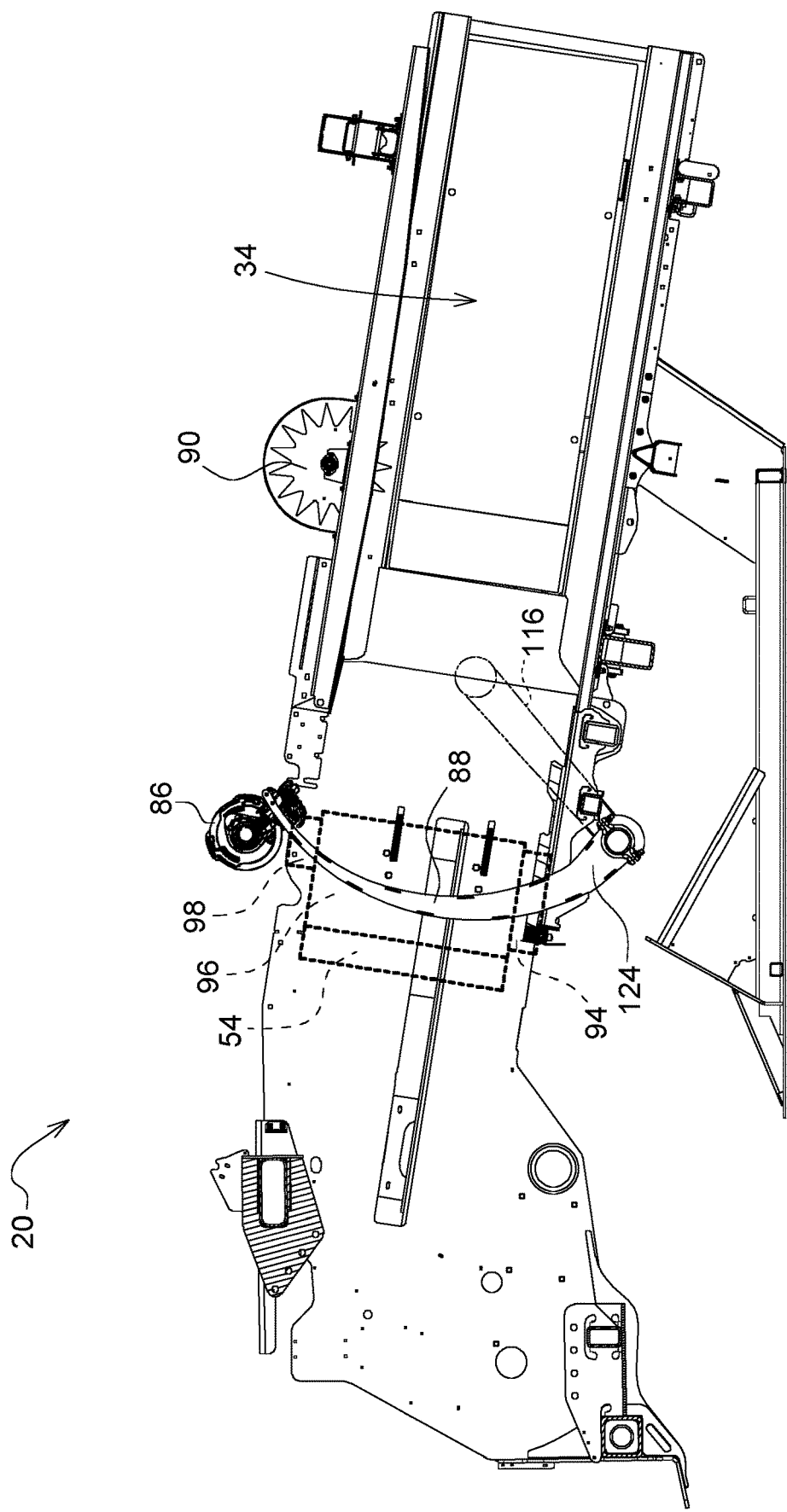
FIG. 4 is an enlarged schematic side view showing the knotter system in a wrapping position.

Referring to FIGS. 3 and 4, the knotter system 56 may include one or more binding or knotter assemblies 86 and one or more corresponding delivery devices or needles 88, which can deliver binding material, i.e., the wrapping strands 58, to the binding assemblies 86. The knotter system 56 wraps and secures the wrapping strands 58 around the compressed crop material, or crop package, during a binding operation to secure the bale 24. The baler implement 20 may include a measuring device 90, such as a star wheel, which measures the length of the compressed crop material within the compression chamber 34. The measuring device 90 may activate the knotter system 56 when the compressed crop material within the compression chamber 34 reaches a desired mass, size, or length. The measuring device 90 may activate the knotter assembly 86 via a mechanical trip assembly 92. The one or more needles 88 may each move from a standby position generally below or underneath the baler implement 20, shown for example in FIG. 3, to a wrapping position, as shown for example in FIG. 4, passing through a slot 94 in the bottom of the compression chamber 34, a vertically extending slot 96 in the plunger 54, and a slot 98 in the top in of the compression chamber 34. The one or more needles 88 may deliver the wrapping strands 58 to the binding assembly 86, which secures the wrapping strands 58 around the compressed crop material with a knot 60 within the compression chamber 34.

The knotter system 56 may include a delivery mechanism 110 for moving the needles 88 from the standby position to the wrapping position, as shown for example in FIG. 4. The delivery mechanism 110 may include a pivoting lift arm 112 and a support member 114 which pivotally supports a delivery or needle frame 116. The needles 88 can be coupled to the delivery frame 116. The delivery frame 116 is coupled to the lift arm 112 by a lift link 118. When the pivoting lift arm 112 rotates, the lift link 118 raises the delivery frame 116 and the coupled needles 88 from the standby position, as shown in FIG. 3, through an intermediate position, to the wrapping position, as shown in FIG. 4.

With reference to FIGS. 3 and 4, the needles 88 wrap the wrapping strands 58 around at least a portion of the compressed crop or crop package and provides the wrapping strands 58 to the binding assembly 86. The needles 88 remain in the standby position as the crop material in the compression chamber 34 accumulates to pre-determined quantity, size, or amount. The knotter system 56 activates and the needles 88 move from the standby position up through the slot 94 in the bottom of the compression chamber 34. The needles 88 continue to move upward through the compression chamber 34 in front of or forward of the crop material in the compression chamber 34. The needles 88 move through the slot 96 located in a compression surface of the plunger 54, which can be in contact with the crop material in the compression chamber 34. The needles 88 continue to move upward through the compression chamber 34 and through the slot 98 in the top of the compression chamber 34 to the binding assembly 86. The needles 88 deliver the wrapping strands 58 to the binding assembly 86, which secures the wrapping strands 58 around the compressed crop material with the knot 60 within the compression chamber 34. The needles 88 then begin moving downward out of the slot 98 in the top of the compression chamber 34 and back through the compression chamber 34. The needles 88 move downward out of slot 94 in the bottom of the compression chamber 34 and back to the standby position.

If the baler implement 20 is configured as a round baler (not shown), then the baler implement 20 may be configured with a wrap system. The wrap system is operable to wrap the bale 24 with a wrap material inside the baling chamber 34. Once the bale 24 is formed to a desired cylindrical size, the wrap system feeds the wrap material into the baling chamber 34 to wrap the bale 24 and thereby secure the crop material in a tight package and maintain the desired shape of the bale 24. The wrap material may include, but is not limited to, a twine, a net mesh, or a solid plastic wrap.

Referring to FIG. 2, in the example implementation shown in the figures and described herein, a completed bale 24 is pushed off a rearward end 62 of the baler implement 20 by a subsequently formed bale 24, or otherwise discharged off the rearward end 62 of the baler implement 20 by a powered roller or some other discharge mechanism, whereby the bale 24 is deposited on the ground surface 64.

As shown in FIG. 2, the baler implement 20 may include one or more bale sensors 66 for sensing a property and/or characteristic of the bale 24. For example, the bale sensor 66 may include a Global Positioning Satellite (GPS) system sensor that is operable to determine a location of the bale 24 at the time the bale 24 is discharged from the baler implement 20, a moisture sensor operable to sense a moisture content of the bale 24, a weight sensor operable to sense or determine a weight of the bale 24, etc. The specific type, configuration, and operation of the bale sensor 66 is not pertinent to the teachings of this disclosure, are known to those skilled in the art, and are therefore not described in detail herein.

The baler implement 20 may further include a bale identification system 68. The bale identification system 68 identifies and tracks data related to each respective bale 24. The bale identification system 68 includes, but is not limited to, a tag installer 70, a reader 72, and a baler controller 74.

The tag installer 70 is operable to attach an identification tag 76 to the bale 24. In one implementation, the identification tag 76 includes a Radio Frequency Identification (RFID) tag, such as but not limited to a read only RFID tag. As is understood by those skilled in the art, each respective identification tag 76 is operable to provide a respective identification code 80 that is unique to that identification tag 76. As is understood by those skilled in the art, the identification tag 76 includes a radio transponder, a radio receiver, and a transmitter. In response to an electromagnetic interrogation signal 78 emitted from the reader 72, the identification tag 76 transmits digital data, such as but not limited to the identification code 80 that is unique to that specific identification tag 76. The identification tag 76 may be a passive tag that is powered by energy from the interrogation signal 78, or may include an active tag that includes a dedicated battery for powering the identification tag 76.

The tag installer 70 may include any system or device that is capable of attaching the identification tag 76 to the bale 24. In one implementation, the tag installer 70 includes the knotter system 56 using a special twine having the identification tag 76 embodied as a linear strand or filament that is woven into the twine. The twine may be marked to indicate the location of the identification tag 76 on the respective strand of twine. The identification tag 76 is attached to the bale 24 when the knotter system 56 ties the twine to the bale 24 in the normal operation of the knotter system 56. Alternatively, the identification tag 76 may be attached to the twine, and secured to the bale 24 by the twine when the knotter system 56 ties the twine to the bale 24 in the normal operation of the knotter system 56. It should be appreciated that the tag installer 70 may differ from the example implementations described herein, and may include such other alternatives as a sticker or tag that is pinned to the bale 24, placed between flakes of the bale 24 during bale 24 formation, included with a plastic bale 24 wrap that is wrapped around the bale 24, etc.

Figure 5:
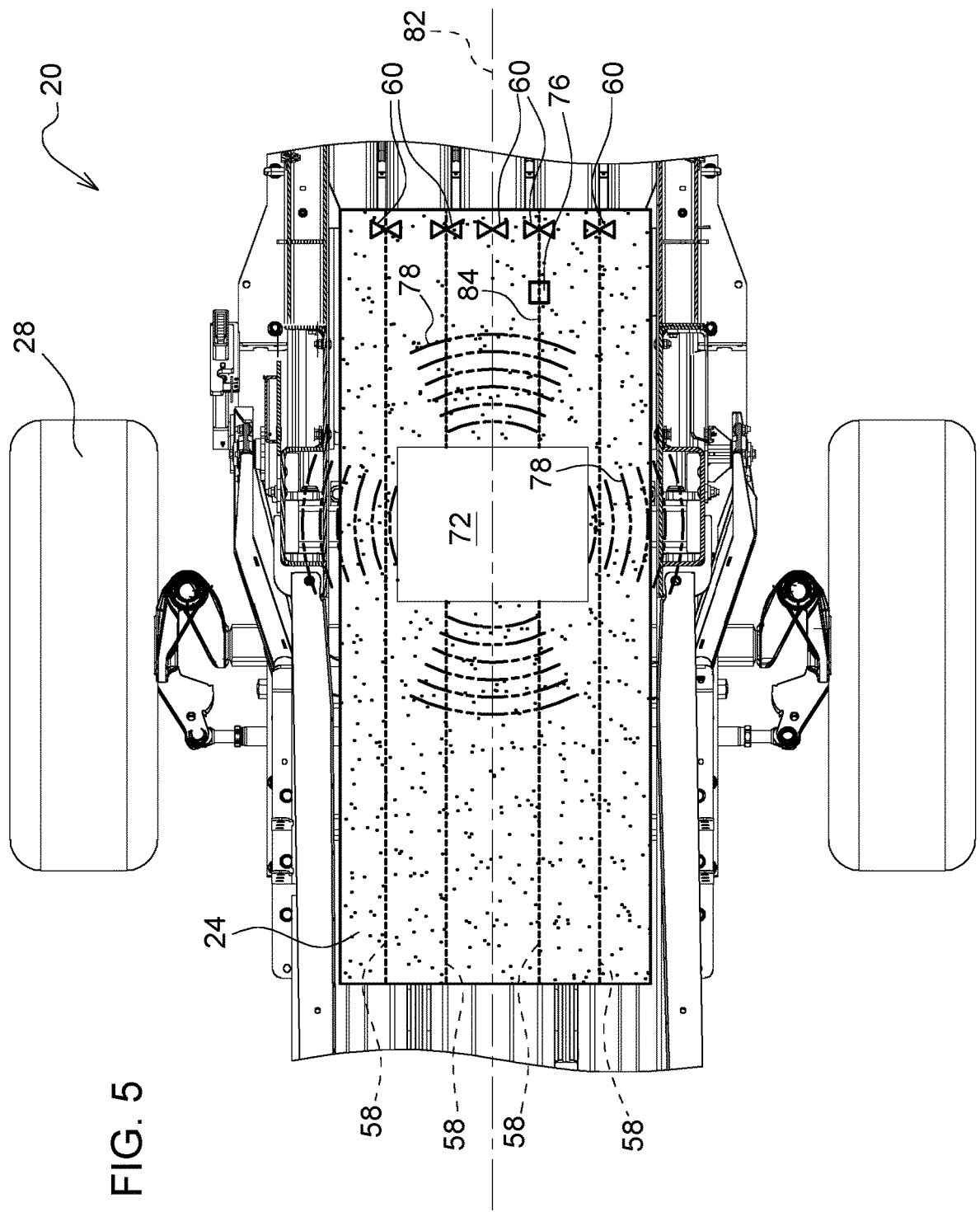
FIG. 5 is a enlarged fragmentary top plan view of the baler implement showing a reader.
Figure 6:
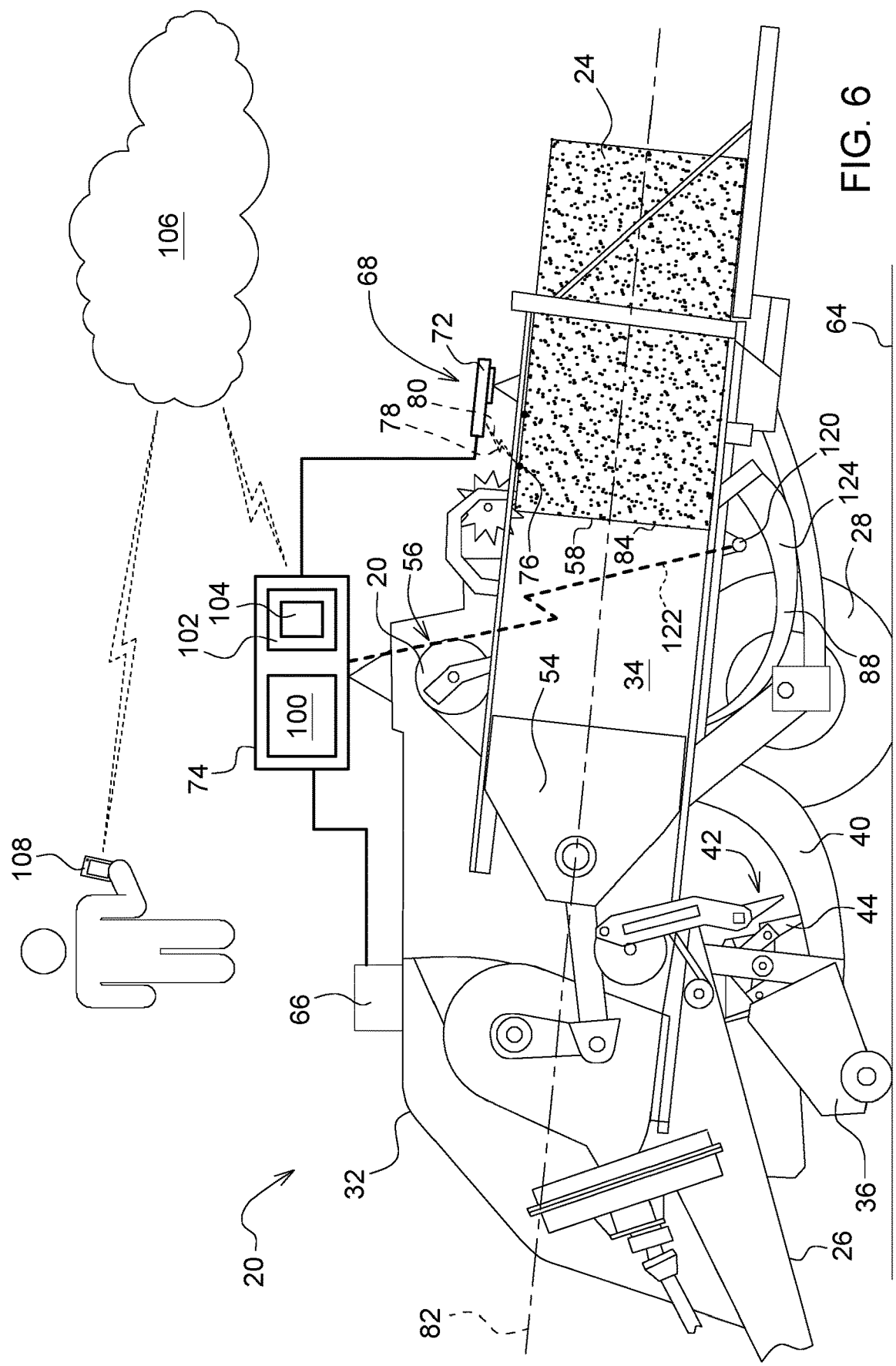
FIG. 6 is a schematic diagram of the baler implement showing the reader interrogating an identification tag and a baler implement controller communicating with a remote memory.

Referring to FIGS. 5 and 6, the reader 72 is positioned to interrogate the identification tag 76. In the example implementation described herein, the reader 72 is a RFID reader 72. However, it should be appreciated that identification tag/reader systems other than a radio frequency system described herein may be used. The reader 72 interrogates the identification tag 76 in order to read or receive data from the identification tag 76. The data from each respective identification tag 76 relates to the identification code 80 that is unique to that respective identification tag 76. The reader 72 interrogates the identification tag 76 by emitting the interrogation signal 78. The identification tag 76 responds to the interrogation signal 78 by transmitting data related to the tag, such as but not limited to the identification code 80 of that respective identification tag 76.

As described above, the reader 72 is positioned to interrogate the identification tag 76. In the example implementation described herein, with reference to FIG. 5, the reader 72 is positioned in-line with the twine relative to a longitudinal axis 82 of the housing 32. As described in greater detail below, the identification tag 76 may be installed on a specific twine band or strap, which may be referred to as an identification twine band 84. As such, the reader 72 may be positioned in-line with the identification twine band 84 relative to the longitudinal axis 82 of the housing 32, such that the identification twine band 84 passes substantially directly underneath the reader 72. Because the bale 24 is moved parallel or in-line with the longitudinal axis 82 of the housing 32 as the bale 24 is formed, secured with twine by the knotter system 56, and then discharged from the baler implement 20, the identification tag 76 moves toward and then underneath the reader 72. This positioning allows the reader 72 to be positioned closely to the identification tag 76. However, in other implementations, the reader 72 may be positioned off-line relative to the movement of the bale 24 and the associated identification tag 76.

The knotter system 56 (described above) includes a component that is moveable between the standby position and the wrapping position, during engagement of the knotter system 56 to warp the bale 24. The moveable component may include any component or feature of the knotter system 56 that moves during actuation of the knotter system 56 to wrap the bale 24 with the strand material 58. For example, referring to FIG. 3, the moveable component may include, but is not limited to, one or more of the knotter assemblies 86 or a component or feature thereof, one or more of the needles 88, the trip assembly 92, the pivoting lift arm 112, the support member 114, the needle frame 116, or the lift link 118. In the example implementation shown in the Figures and described herein, the moveable component is one of the needles 88, and is identified by reference numeral 124. However, it should be appreciated that other implementations may include the moveable component 124 defined as some other component of the knotter system 56 that moves during the bale wrapping process.

Referring to FIG. 6, the baler implement 20 further includes a knotter sensor 120. The knotter sensor 120 is positioned to detect movement of the moveable component 124 between the standby position and the wrapping position. The knotter sensor 120 is operable to communicate a knotter engagement signal 122 in response to detecting movement of the moveable component 124. The knotter sensor 120 may include, but is not limited to, one of an on/off switch that is activated by the movement of the moveable component 124, a light beam sensor, a rotary sensor, a camera, a proximity sensor, or a motion sensor, etc.

Referring to FIG. 6, the reader 72 is in communication with the knotter sensor 120. The reader 72 emits or outputs the interrogation signal 78 in response to the knotter engagement signal 122. The reader 72 is automatically activated to emit the interrogation signal 78 for a defined period of time in response to the knotter engagement signal 122 from the knotter sensor 120 indicating movement of the moveable component 124 of the knotter system 56 while wrapping the bale 24 with the strand material 58.

As described above, with reference to FIG. 6, the bale identification system 68 includes the baler controller 74. The baler controller 74 is disposed in communication with the bale sensor 66(s), the knotter sensor 120, and the reader 72. The baler controller 74 is operable to receive data from the bale sensor 66(s), the knotter sensor 120, control the operation of the reader 72, and receive a signal or data from the identification tag 76. While the baler controller 74 is generally described herein as a singular device, it should be appreciated that the baler controller 74 may include multiple devices linked together to share and/or communicate information therebetween. Furthermore, it should be appreciated that the baler controller 74 may be located on the baler implement 20 or located remotely from the baler implement 20.

The baler controller 74 may alternatively be referred to as a computing device, a computer, a controller, a control unit, a control module, a module, etc. The baler controller 74 includes a processor 100, a memory 102, and all software, hardware, algorithms, connections, bale sensors 66, the knotter sensor 120, etc., necessary to manage and control the operation of the reader 72. As such, a method may be embodied as a program or algorithm operable on the baler controller 74. It should be appreciated that the baler controller 74 may include any device capable of analyzing data from various bale sensors 66, comparing data, making decisions, and executing the required tasks.

As used herein, "controller" is intended to be used consistent with how the term is used by a person of skill in the art, and refers to a computing component with processing, memory, and communication capabilities, which is utilized to execute instructions (i.e., stored on the memory or received via the communication capabilities) to control or communicate with one or more other components. In certain embodiments, the baler controller 74 may be configured to receive input signals in various formats (e.g., hydraulic signals, voltage signals, current signals, CAN messages, optical signals, radio signals), and to output command or communication signals in various formats (e.g., hydraulic signals, voltage signals, current signals, CAN messages, optical signals, radio signals).

The baler controller 74 may be in communication with other components on the baler implement 20, such as hydraulic components, electrical components, and operator inputs within an operator station of an associated work vehicle. The baler controller 74 may be electrically connected to these other components by a wiring harness such that messages, commands, and electrical power may be transmitted between the baler controller 74 and the other components. Although the baler controller 74 is referenced in the singular, in alternative embodiments the configuration and functionality described herein can be split across multiple devices using techniques known to a person of ordinary skill in the art.

The baler controller 74 may be embodied as one or multiple digital computers or host machines each having one or more processors, read only memory (ROM), random access memory (RAM), electrically-programmable read only memory (EPROM), optical drives, magnetic drives, etc., a high-speed clock, analog-to-digital (A/D) circuitry, digital-to-analog (D/A) circuitry, and any required input/output (I/O) circuitry, I/O devices, and communication interfaces, as well as signal conditioning and buffer electronics.

The computer-readable memory 102 may include any non-transitory/tangible medium which participates in providing data or computer-readable instructions. The memory 102 may be non-volatile or volatile. Non-volatile media may include, for example, optical or magnetic disks and other persistent memory. Example volatile media may include dynamic random access memory (DRAM), which may constitute a main memory. Other examples of embodiments for memory include a floppy, flexible disk, or hard disk, magnetic tape or other magnetic medium, a CD-ROM, DVD, and/or any other optical medium, as well as other possible memory devices such as flash memory.

The baler controller 74 includes the tangible, non-transitory memory 102 on which are recorded computer-executable instructions, including a bale identification algorithm 104. The processor 100 of the baler controller 74 is configured for executing the bale identification algorithm 104. The bale identification algorithm 104 implements a method of identifying and tracking the bale 24 of material, described in detail below.

The method of identifying and tracking the bale 24 includes collecting the crop material with the pick-up mechanism 36 of the baler implement 20, conveying the crop material from the pick-up mechanism 36 into the baling chamber 34, and then forming the crop material into the bale 24 within the baling chamber 34. The formed bale 24 may then be wrapped with the knotter system 56 with the strand material 58, such as but not limited to twine, to secure the shape of the bale 24. The general procedure and processes used to form and secure the bale 24 within the baler implement 20 are dependent upon the specific configuration of the baler implement 20, are known to those skilled in the art, and are therefore not described in greater detail herein.

The identification tag 76 is installed onto the bale 24 with the tag installer 70. In the example implementation described herein, the identification tag 76 is a RFID tag that is integrated into a filament of one of the bands of twine securing the bale 24. The specific band of twine including the identification tag 76 may be referred to as the identification twine band 84. In the example implementation described herein, the identification tag 76 is installed by the knotter system 56 when the knotter system 56 wraps the bale 24 with the strand material 58 having the identification tag 76 filament. It should be appreciated that the identification tag 76 may be installed differently than the example implementation described herein.

The baler controller 74 receives data from the bale sensor 66 related to a property or characteristic of the bale 24. The property of the bale 24 sensed by the bale sensor 66 may include, but is not limited to, a location of the bale 24 when discharged from the baler implement 20 a moisture content of the bail, a constituent content list of the crop material forming the bale 24, a weight of the bale 24, etc.

Upon activation of the knotter system 56 to wrap the bale 24 with the strand material 58, the knotter sensor 120 senses movement of the moveable component 124 of the knotter system 56, between the standby position and the wrapping position. In response to detecting the movement of the moveable component 124, the knotter sensor 120 emits the knotter engagement signal 122. The baler controller 74 receives the knotter engagement signal 122 from the knotter sensor 120, and then controls the reader 72 to emit the interrogation signal 78 in response to receiving the knotter engagement signal 122. The reader 72 emits the interrogation signal 78 for a defined period of time, after which the reader 72 stops emitting the interrogation signal 78 until controlled to once again emit the interrogation signal 78 at the next bale wrapping cycle.

In response to the interrogation signal, the identification tag 76 may emit the identification signal. The identification signal includes identification data related to the identification tag 76. The identification data related to the identification tag 76 may include, but is not limited to, the identification code 80 associated with that identification tag 76. The baler controller 74 and/or the reader 72 may receive the identification code 80 via the identification signal.

When the reader 72 receives the identification code 80 from the identification tag 76, the reader 72 communicates the identification code 80 to the baler controller 74. The baler controller 74 may then associate the data related to the bale 24 with the identification data from the identification tag 76 of the bale 24, i.e., the identification code 80. The baler controller 74 may then communicate the associated data related to the bale 24 and the identification data from the identification tag 76 to a remote memory 106. The remote memory 106 may include Cloud based storage, or some third party storage facility capable of storing electronic data.

Once the data related to the bale 24 and the unique identification code 80 from the identification tag 76 are associated together and stored in the remote memory 106, an operator may scan the identification tag 76 on the bale 24 with a second reader 108, e.g., a handheld RFID reader 72, to obtain the unique identification code 80 for that specific bale 24. The operator may then query the remote memory 106 using the identification code 80 from the bale 24, and obtain the data related to that bale 24 that is associated with the identification code 80 of the identification tag 76 on that bale 24.

As used herein, "e.g." is utilized to non-exhaustively list examples, and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A baler implement comprising:
   a housing defining a baling chamber for forming crop material into a bale;
   a knotter system engageable to wrap the bale with a wrapping strand;
   wherein the knotter system includes a component moveable between a standby position and a wrapping position during engagement of the knotter system to wrap the bale;
   a knotter sensor positioned to detect movement of the component between the standby position and the wrapping position and operable to communicate a knotter engagement signal in response to movement of the component;

a tag installer operable to attach an identification tag to the bale;

a reader in communication with the knotter sensor and positioned to interrogate the identification tag, wherein the reader is operable to emit an interrogation signal and receive an identification signal from the identification tag in response to the interrogation signal; and wherein the reader is automatically activated to emit the interrogation signal for a defined period of time in response to the knotter engagement signal from the knotter sensor indicating movement of the component of the knotter system while wrapping the bale with the strand material.

2. The baler implement set forth in claim 1, wherein the reader is a radio frequency identification reader, and the identification tag is a radio frequency identification tag.

3. The baler implement set forth in claim 2, wherein the identification tag is a read only radio frequency identification tag.

4. The baler implement set forth in claim 1, further comprising a bale sensor for sensing a property of the bale, and a baler implement controller having a processor and a memory having a bale identification algorithm stored thereon, wherein the processor is operable to execute the bale identification algorithm to:

receive data related to the bale from the bale sensor;

receive the knotter engagement signal from the knotter sensor;

control the reader to emit the interrogation signal in response to receiving the knotter engagement signal;

receive the identification signal from the identification tag in response to the interrogation signal, wherein the identification signal includes identification data related to the identification tag;

associate the data related to the bale with the identification data related to the identification tag of the bale;

communicate the associated data related to the bale and the identification data related to the identification tag to a remote memory.

5. The baler implement set forth in claim 1, wherein the wrapping strand is one of a twine material or a plastic strap material.

6. The baler implement set forth in claim 1, wherein the component is one of a knotter assembly, a needle, a trip assembly, a pivoting lift arm, the support member, a needle frame, or a lift link.

7. The baler implement set forth in claim 1, wherein the knotter sensor is one of an on/off switch, a light beam sensor, a rotary sensor, a camera, a proximity sensor, or a motion sensor.

8. A method of identifying and tracking a bale, the method comprising:

collecting crop material with a pick-up of a baler implement;

conveying the crop material from the pick-up into a baling chamber of the baler implement;

forming the crop material into a bale having a shape within the baling chamber;

wrapping the bale with a strand material using a knotter system of the baler implement to secure the shape of the bale, wherein the knotter system includes a component that moves between a standby position and a wrapping position while wrapping the bale with the strand material;

installing an identification tag onto the bale with a tag installer, wherein the identification tag is a radio frequency identification tag including data related to the identification tag;

receiving data from a bale sensor, with a baler implement controller, wherein the data is related to a characteristic of the bale;

receiving a knotter engagement signal from a knotter sensor indicating movement of the component;

emitting an interrogation signal from a reader for a predefined period of time in response to receiving the knotter engagement signal;

receiving the identification data related to the identification tag, with the reader, in response to the interrogation signal;

associating, with the baler implement controller, the data related to the characteristic of the bale with the identification data from the identification tag of the bale; and communicating, with the baler implement controller, the associated data related to the bale and the identification data from the identification tag to a remote memory.

9. The method set forth in claim 8, wherein the component is one of a knotter assembly, a needle, a trip assembly, a pivoting lift arm, the support member, a needle frame, or a lift link.

10. The method set forth in claim 8, wherein the knotter sensor is one of an on/off switch, a light beam sensor, a rotary sensor, a camera, a proximity sensor, or a motion sensor.

\* \* \* \* \*